(No Model.)
E. KAUFFELD
APPARATUS FOR BOILING AND COOLING MASH.
No. 325,091. Patented Aug. 25, 1885.
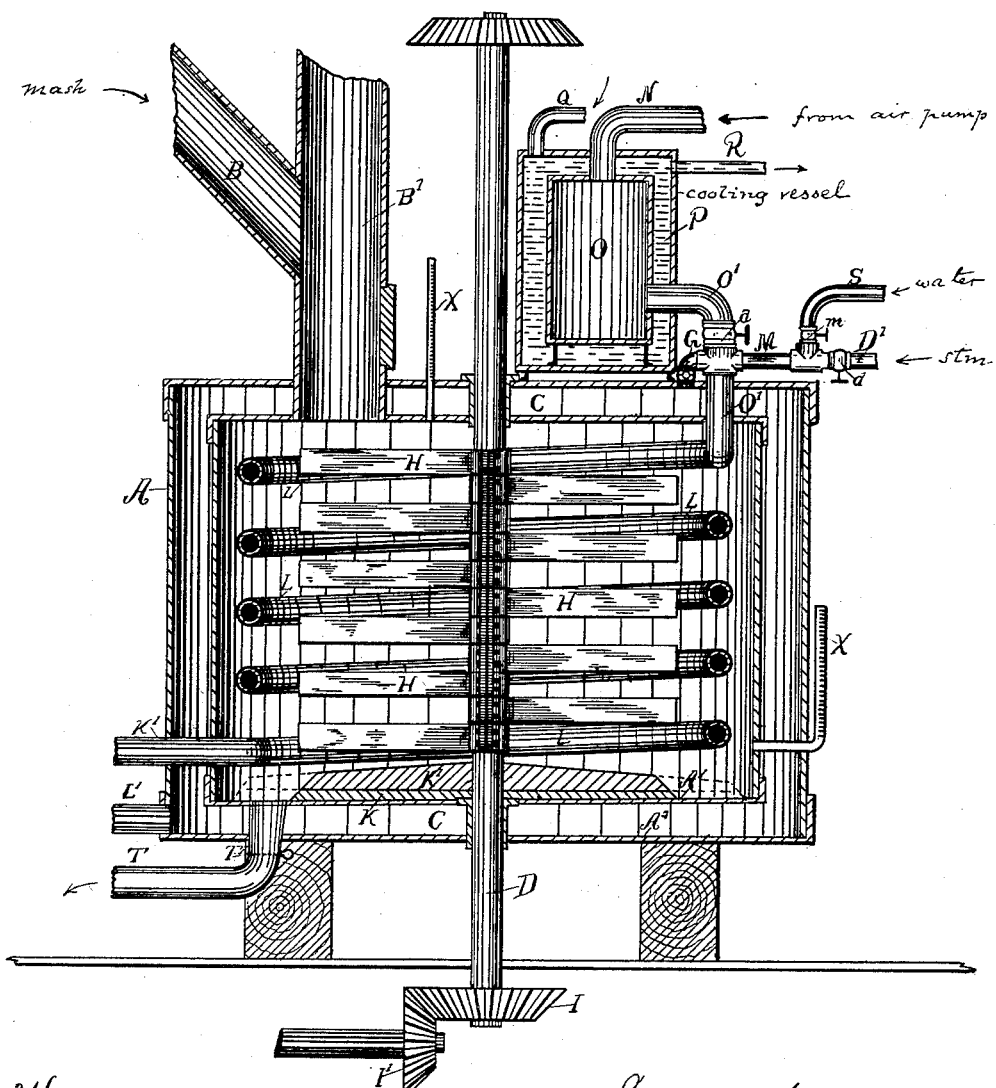

United States Patent Office.

ELIAS KAUFFELD, OF PITTSBURG, PENNSYLVANIA, ASSIGNOR OF ONE-HALF TO THOMAS MILLER, OF SAME PLACE.

APPARATUS FOR BOILING AND COOLING MASH.

SPECIFICATION forming part of Letters Patent No. 325,091, dated August 25, 1885.

Application filed May 27, 1885. (No model.)

*To all whom it may concern:*

Be it known that I, ELIAS KAUFFELD, of Pittsburg, in the county of Allegheny and State of Pennsylvania, have invented certain new and useful Improvements in Apparatus for Boiling and Cooling Mash; and I do hereby declare that the following is a full, clear, and exact description of the invention, which will enable others skilled in the art to which it appertains to make and use the same, reference being had to the accompanying drawing, which form a part of this specification.

This invention has relation to mash boiling, grinding, and cooling apparatus, and has for its object the provision of an apparatus consisting, essentially, of a double-walled vessel or mash-tub inclosing a coil of pipe for the passage of steam or water, and containing a series of rotary mixers and a pair of grinding surfaces, whereby the mash may be thoroughly and expeditiously boiled, mixed, and ground, and finally cooled, in one continuous operation.

My invention consists in the novel construction, combination, and arrangement of parts as hereinafter described and specifically claimed.

Referring to the accompanying drawing, wherein the figure is a vertical central section of an apparatus embodying my improvements, A designates a tub or tank of cylindrical form, composed of the inner and outer casings, A' A², so arranged as to leave between them on all sides a narrow space, C. The inner casing constitutes the receptacle for the mash, and has passing through it a vertical shaft, D, armed with radial paddles or beaters H H, suitably arranged and adapted when in motion to mix the mash and throw it outward toward and against the surface of the tub.
The shaft D is rotated by any suitable power—as, for instance, beveled gearing I I'

To the bottom of the inner casing, A', is secured a roughened disk or plate, K, and upon the shaft D is fixed a corresponding plate, k', which, with the plate K, constitutes a means of grinding such portions of the mash as are not thoroughly ground when admitted to the tank.

L designates a coil of pipe located within the casing A', near its wall, and having its inlet O' leading through the top of both casings, and its outlet k' leading through the walls thereof near their bottoms. This pipe communicates at its upper end with a tank, O, situated within a cooling-chamber, P, between which and the tank O is left sufficient space for the circulation of cooling-water. The tank O has a pipe, N, leading into its upper part, and with said pipe may be connected an airpump for the purpose of supplying the tank O and the coiled pipe with air, said air being cooled by the water within the vessel P. The vessel P is provided with an inlet or supply pipe, Q, and an overflow, R. In the branch O' leading from the tank O to the coil is situated a cock or valve, a, to govern the supply of air and regulate its admission.

D' designates a pipe leading from a steam-supply and joining the air supply-pipe O' below the cock a. A pipe, M, is connected by the pipe S with a water-supply for a purpose which will be hereinafter explained. The pipes D' and S are provided with suitable cocks or valves, m d, to open and close the same.

L' and T designate outlets communicating with the space between the two casings and with the interior of the inner casing, respectively.

B designates the mash pipe, which leads from the mash-boiler or other source of supply to the mash-tub; and B' designates a pipe connected with the pipe B, and designed for the admission of ground meal, malt, water, and for ventilating purposes.

X X are thermometers or gages for noting the temperature, &c.

The operation of the apparatus is as follows: The mash leaves the boiler or mill in an unground or partially boiled condition, and in the apparatus which I have described is subjected to further and final grinding and boiling. After the mash has been admitted to the tub, steam is admitted through the pipe D'. The cocks a and m being closed, the steam passes into the worm or coiled pipe L, and, passing through the same, soon heats the contents of the tub to the boiling-point. If desirable, steam may also be admitted into the space C, through branch G, leading from steam-pipe D'. While the mash is boiling, and in order to keep it thoroughly mixed and equally boiled, the paddles H are set in motion through the medium of the shaft D, and operate to throw the mash outwardly against the coiled pipe or worm. Should the mash require further grinding, such grinding will be effected by the plates K k'. After the mash has been thoroughly boiled and ground, it may be cooled in either of the following ways: First, by turning off the steam supply from pipe D', and after allowing the dead steam to escape by way of the outlets K' L', admitting water to the coil and to the space C from the pipe S. This water will take exactly the same course as the steam, and by leaving the outlets K' L' open a constant circulation of water will be maintained. By the motion of the paddles the mash will be thrown outward against the coil of pipe and a thorough cooling soon effected; second, by admitting air from the pump into the tank O, where it is cooled, and then conducting such air through the branch C' into the coil L, water at the same time being admitted into the tank P in order to cool the air. Under this operation the course of the air is the same as was that of the steam through the coil. In order to promote the circulation of the air a suction-pump may be attached to the outlet K' of the coil L. When the mash is thoroughly cooled, it may be withdrawn from the tub through the spout T upon opening the gate T'. It will be observed that the mash-tub is perfectly close and air-tight, whereby the formation of acetic, lactic, or butyric fermentation is effectually prevented.

Having described my invention, I claim—

1. In a mash-preparing apparatus, the combination, with a mash-tub having an inner and outer casing with an intervening space, of a vertical rotary shaft armed with paddles or beaters, a coil of pipe surrounding said beaters, and a pipe communicating with said coil and said intervening space, and the air-chamber, water-supply, and steam-supply for the admission of steam and water or air, substantially as described.

2. In a mash-preparing apparatus, the combination, with mash-tub and a vertical rotary shaft armed with paddles, of a cooling and heating coil, an air-cooling tank, a water-box inclosing said tank, a steam-supply, and means, substantially as described, for controlling the admission of steam and cooled air to the coil, as set forth.

In testimony that I claim the foregoing as my own, I have hereto affixed my signature in presence of two witnesses.

ELIAS KAUFFELD.

Witnesses:
 AHA. A. MOORE,
 C. L. STRAUB.